(12) United States Patent
Uemura

(10) Patent No.: US 7,964,836 B2
(45) Date of Patent: Jun. 21, 2011

(54) SOLID-STATE IMAGING DEVICE

(75) Inventor: Akira Uemura, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 302 days.

(21) Appl. No.: 12/411,574

(22) Filed: Mar. 26, 2009

(65) Prior Publication Data

US 2009/0242737 A1  Oct. 1, 2009

(30) Foreign Application Priority Data

Mar. 28, 2008  (JP) ................................. 2008-085458

(51) Int. Cl.
*H01L 27/00* (2006.01)

(52) U.S. Cl. .................. 250/208.1; 250/214 R; 348/297

(58) Field of Classification Search ............... 250/208.1, 250/214.1, 214 R; 348/294, 297, 298, 303, 348/304, 312; 257/239, 290, 291
See application file for complete search history.

(56) References Cited

U.S. PATENT DOCUMENTS

| 6,999,123 B1* | 2/2006 | Takahashi | 348/312 |
| 2008/0135885 A1* | 6/2008 | Uemura | 257/239 |

* cited by examiner

*Primary Examiner* — Kevin Pyo
(74) *Attorney, Agent, or Firm* — Young & Thompson

(57) ABSTRACT

A solid-state imaging device includes a light receiving section (LRS) comprising pixels. The LRS is divided into division regions; a charge transferring section (CTS) transferring charges accumulated in the LRS; an accumulation control electrode provided between the LRS and the CTS transfers charge accumulated in the LRS to the CTS responsive to an accumulation control signal; a monitoring sensor group comprising monitoring sensors respectively provided for the division regions, outputting sensor outputs of the monitoring sensors corresponding to charges amounts of the division regions; a charge detecting circuit outputting a charge detection signal indicating that a predetermined charge quantity is accumulated in at least one of the division regions, based on the sensor outputs from the monitoring sensor group; and a signal control circuit outputting the accumulation control signal in response to the charge detection signal. The charge detecting circuit comprises division region charge detecting sections for the monitoring sensors.

9 Claims, 4 Drawing Sheets

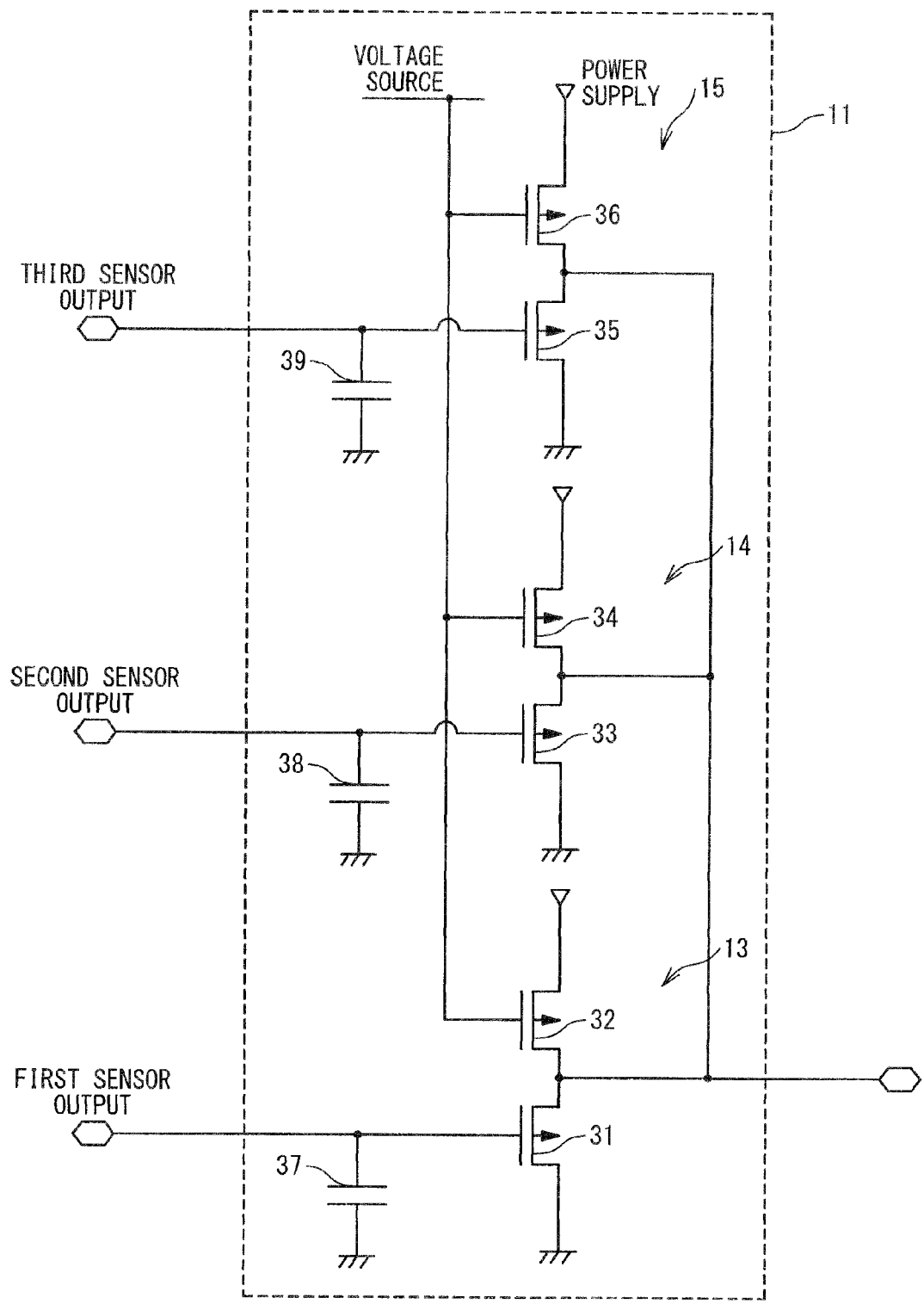

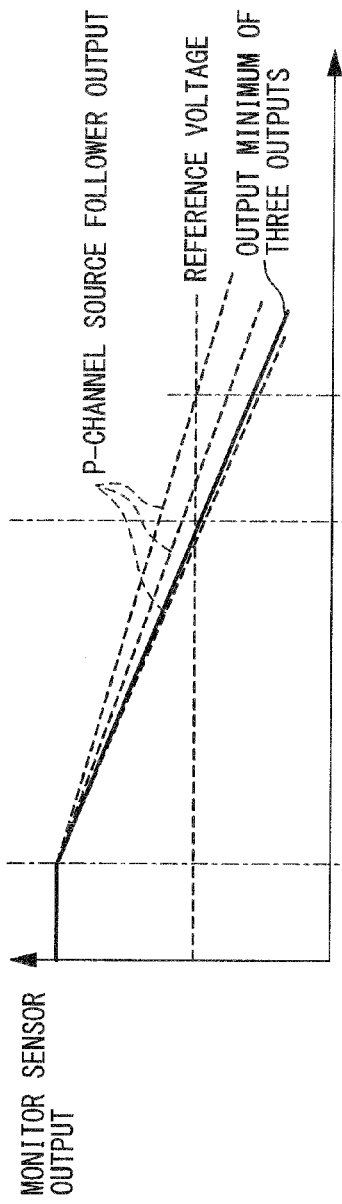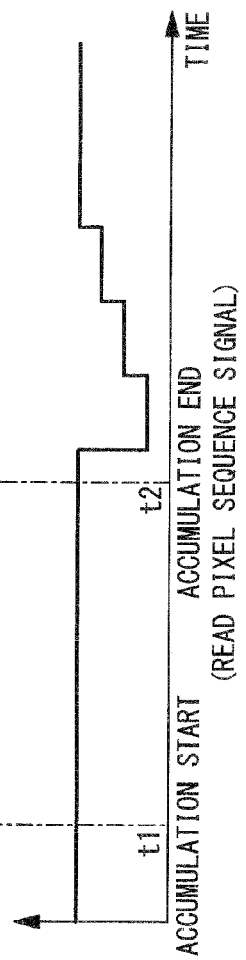

SOLID-STATE IMAGING DEVICE

INCORPORATION BY REFERENCE

This patent application claims priority on convention based on Japanese Patent Application No. 2008-085458. The disclosure thereof is incorporated herein by reference.

BACKGROUND OF THE INVENTION

1. Field of the Invention

The present invention relates to a solid-state imaging device.

2. Description of Related Art

A technique is known which provides a monitoring sensor in a solid-state imaging device and controls a pixel output by using a monitoring sensor output, as described in Japanese Patent Application Publication (JP-A-Showa 59-196666). Such a technique is widely used in an auto-focusing image sensor. When the monitoring sensor is arranged in adjacent to an entire pixel sequence, a signal from the monitoring sensor reflects an average signal amount from the pixel sequence. By ending a charge accumulation of the pixel sequence when its output reaches a reference voltage, an approximately constant signal of the pixel sequence independent of light intensity can be obtained. At this time, when non-uniformity of the signal from the pixel sequence is great, a distance cannot be accurately measured sometimes since the signal is partially saturated even under such a control.

In the technique described in Japanese Patent Application Publication (JP-A-Showa 59-196666), the monitoring sensor is divided into a plurality of monitoring sensor sections and comparison with a reference voltage is carried out by a comparator for each monitoring sensor section. By calculating a NAND of outputs from the comparators, a minimum level of the signal is detected and the charge accumulation of the pixel sequence is controlled. The NAND result of the comparator outputs changes in response to the output change of a first one of the comparators. In response to this, a signal to read a charge signal from the pixel sequence is outputted and the charge accumulation is ended. In the technique described in Japanese Patent Application Publication (JP-A-Showa 59-196666), the charge accumulation of the pixel sequence is controlled by such a configuration and operation in relation with the monitoring sensor with the largest signal output amount (the smallest output level). For this reason, the partial saturation of the pixel sequence signal is hardly caused in comparison with a case of using a single monitoring sensor. In the technique described Japanese Patent Application Publication (JP-A-Showa 59-196666), minimum value is detected by arranging the comparator for each monitoring sensor and by calculating the NAND of outputs from the comparators. Accordingly, the comparators of the same number as the number of monitoring sensors are required.

The comparator is a relatively complicated circuit. Accordingly, an increase of the comparator leads to increase of a circuit area. When the number of monitoring sensors is increased to improve accuracy of the control, a control circuit becomes complicated to increase a chip size.

SUMMARY

In an aspect of the present invention, a solid-state imaging device includes: a light receiving section comprising a plurality of pixels, wherein the light receiving section is divided into a plurality of division regions; a charge transferring section configured to transfer charges accumulated in the light receiving section; an accumulation control electrode provided between the light receiving section and the charge transferring section and configured to transfer the charge accumulated in the light receiving section to the charge transferring section in response to an accumulation control signal; a monitoring sensor group comprising a plurality of monitoring sensors respectively provided for the plurality of division regions, and configured to output sensor outputs of the plurality of monitoring sensors corresponding to amounts of the charges of the plurality of division regions; a charge detecting circuit configured to output a charge detection signal indicating that a predetermined amount of charge is accumulated in at least one of the plurality of division regions, based on the sensor outputs from the monitoring sensor group; and a signal control circuit configured to output the accumulation control signal in response to the charge detection signal. The charge detecting circuit comprises a plurality of division region charge detecting sections provided for the plurality of monitoring sensors.

In another aspect of the present invention, a method of controlling charge transfer in a solid-state imaging device, is achieved: by accumulating charges in a light receiving section comprising a plurality of division regions; by generating sensor outputs corresponding to amounts of the charges accumulated in the plurality of division regions by a plurality of monitoring sensors respectively provided for the plurality of division regions; by generating a charge detection signal indicating that a predetermined amount of charge is accumulated in at least one of the plurality of division regions, based on the sensor outputs; by generating an accumulation control signal in response to the charge detection signal; and by transferring the accumulated charges from the light receiving section to a charge transferring section by an accumulation control electrode in response to an accumulation control signal.

According to the present invention, since the number of comparators having a complicated circuit configuration can be reduced as well as an NAND circuit, a solid-state imaging device having a reduced circuit area can be configured.

BRIEF DESCRIPTION OF THE DRAWINGS

The above and other objects, advantages and features of the present invention will be more apparent from the following description of certain embodiments taken in conjunction with the accompanying drawings, in which:

FIG. 3 is a circuit diagram showing a detailed configuration of a charge detecting circuit; and FIG. 4A shows a temporal change of a charge detection signal outputted from the charge detecting circuit, FIG. 4B shows an output of a comparator, FIG. 4C shows an output of an accumulation control signal generator, and FIG. 4D shows a temporal change of an operation of the light receiving sect ion (pixel sequence) 2.

DESCRIPTION OF THE PREFERRED EMBODIMENTS

Hereinafter, a solid-state imaging device of the present invention will be described below.

Figure 1:
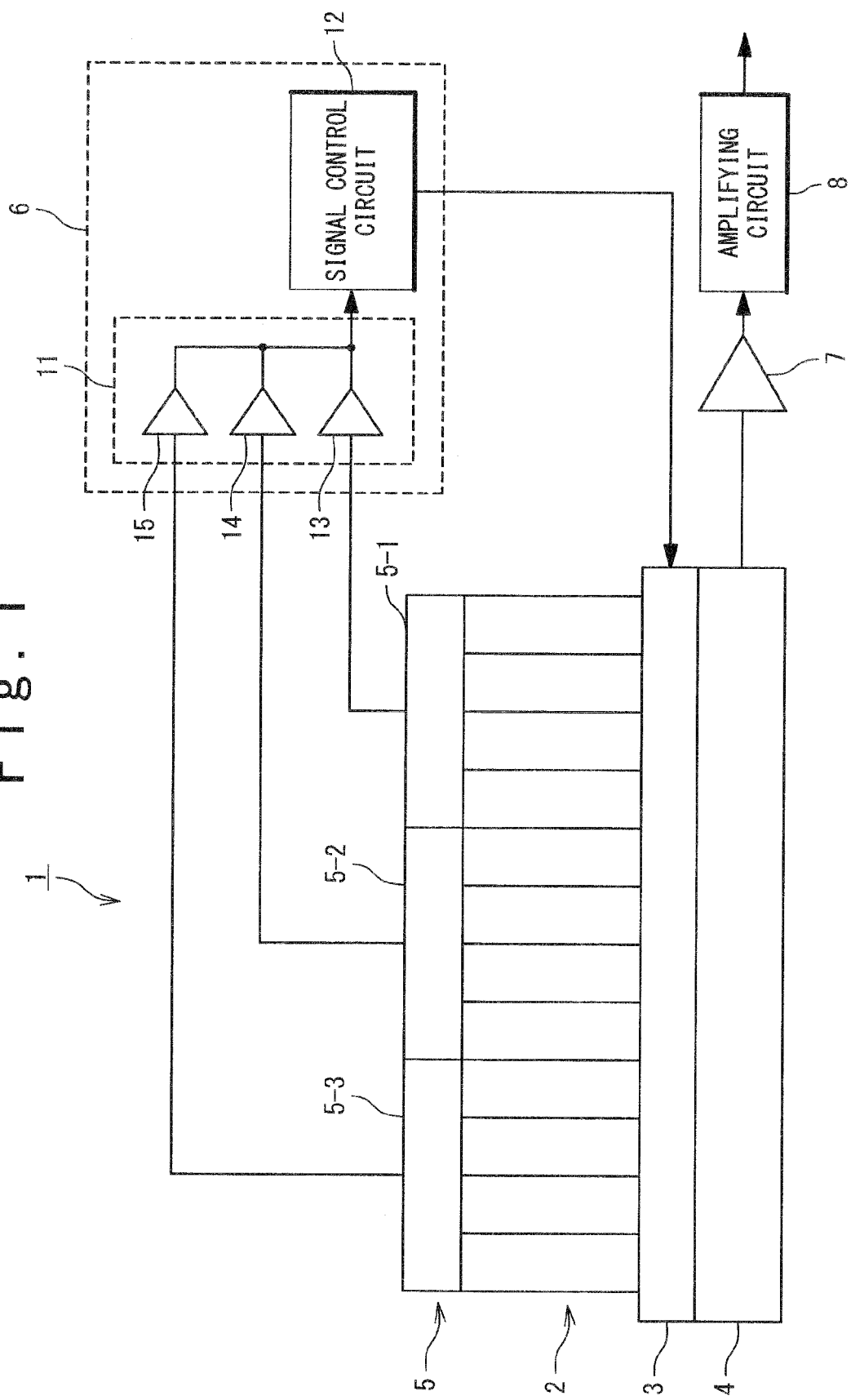
FIG. 1 is a block diagram showing a configuration of a solid-state imaging device 1 of the present embodiment.

FIG. 1 is a block diagram showing a configuration of a solid-state imaging device 1 of the present embodiment. The solid-state imaging device 1 includes a light receiving section (a pixel sequence) 2, an accumulation control electrode 3, a CCD (Charge-Coupled Device) 4, a monitoring sensor unit 5, an accumulation control signal generator 6, a transfer charge detecting circuit 7, and an amplifier circuit 8.

The light receiving section (pixel sequence) 2 includes a plurality of photodiodes (pixels). The accumulation control electrode 3 transfers charges accumulated in the light receiving section 2 to the CCD 4 in response to an accumulation control signal. The CCD 4 transfers the charges from the accumulation control electrode 3 to the transfer charge detecting circuit 7. The transfer charge detecting circuit 7 converts the charges transferred from the CCD 4 into a voltage signal and outputs the voltage signal to the amplifier circuit 8. The amplifier circuit 8 amplifies the voltage signal from the transfer charge detecting circuit 7 and output the amplified signal.

The monitoring sensor unit 5 is arranged in adjacent to the pixel sequence 2 including a plurality of pixels. The monitoring sensor unit 5 includes a plurality of independently operating monitoring sensors (a first monitoring sensor 5-1, a second monitoring sensor 5-2, and a third monitoring sensor 5-3). To facilitate understanding of the solid-state device 1 in the present embodiment, FIG. 1 shows a device in which the monitoring sensor unit 5 includes three monitoring sensors. It should be noted that the configuration in FIG. 1 does not limit the configuration of the monitoring sensor unit 5 in the present invention.

The accumulation control signal generator 6 receives a sensor output outputted from each of the first monitoring sensor 5-1, a second monitoring sensor 5-2, and a third monitoring sensor 5-3 and generates an accumulation control signal on the basis of the sensor outputs. The accumulation control signal generator 6 includes a charge detecting circuit 11 and a signal control circuit 12. The charge detecting circuit 11 includes a first division region charge detecting section 13, a second division region charge detecting section 14, and a third division region charge detecting section 15. The first division region charge detecting section 13 is connected to the first monitoring sensor 5-1, the second division region charge detecting section 14 is connected to the second monitoring sensor 5-2, and the third division region charge detecting section 15 is connected to the third monitoring sensor 5-3. Each of the plurality of the charge detecting sections 13 to 15 independently receives the sensor output from the corresponding monitoring sensor. The charge detecting circuit 11 generates a charge detection signal on the basis of the received sensor outputs and outputs the charge detection signal to the signal control circuit 12. The signal control circuit 12 generates the accumulation control signal on the basis of the charge detection signal supplied from the charge detecting circuit 11 and outputs the accumulation control signal to the accumulation control electrode 3.

Figure 2:
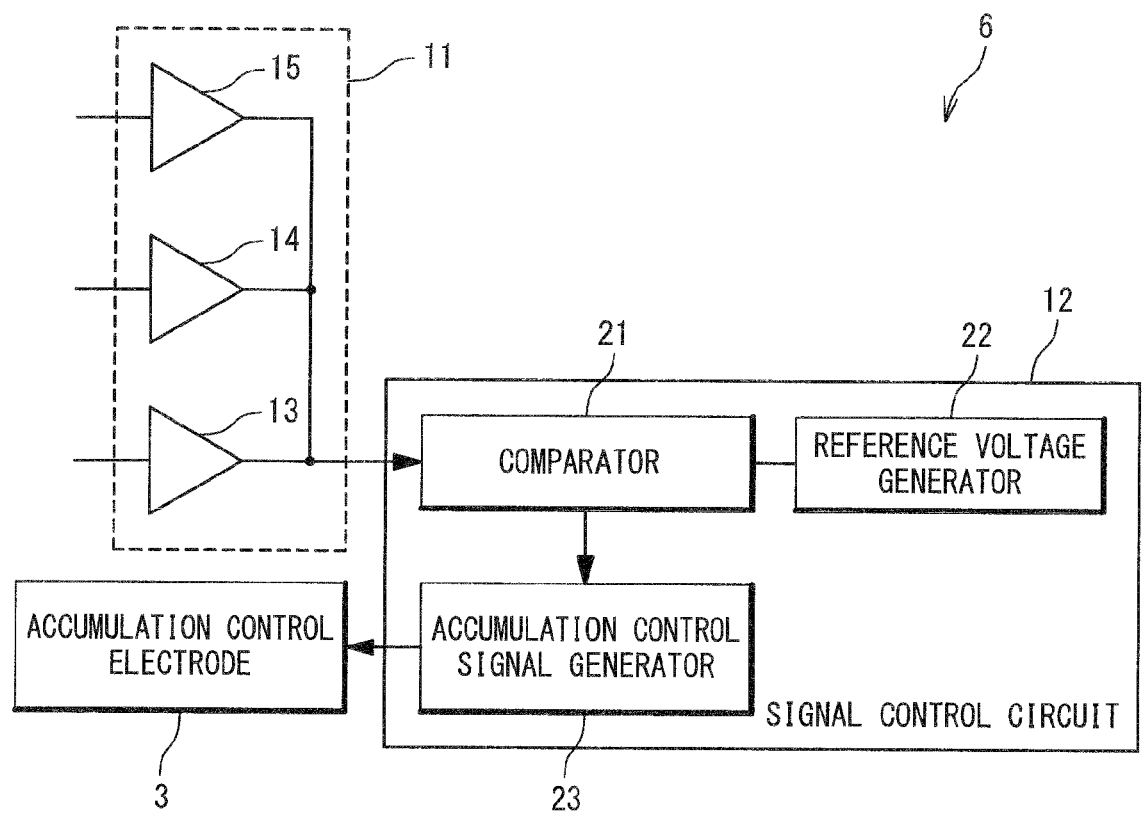
FIG. 2 is a block diagram showing a configuration of a signal control circuit.

FIG. 2 is a block diagram showing a configuration of the signal control circuit 12. The signal control circuit 12 includes a comparator 21, a reference voltage generator 22, and an accumulation control signal generator 23. As shown in FIG. 2, a charge detection signal outputted from, the charge detecting circuit 11 is supplied to the comparator 21. The comparator 21 compares the charge detection signal with a reference voltage signal supplied from the reference voltage generator 22 and outputs a result of the comparison to the accumulation control signal generator 23. The accumulation control signal generator 23 generates the accumulation control signal on the basis of the comparison result supplied from the comparator 21 to control the accumulation control electrode 3 to be turned on or off in response to the accumulation control signal.

FIG. 3 is a circuit diagram showing a detailed configuration of the charge detecting circuit 11. As described above, the charge detecting circuit 11 includes the first division region charge detecting section 13, the second division region charge detecting section 14, and the third division region charge detecting section 15. The first division region charge detecting section 13 includes a source follower including a first P-channel MOS transistor 31 and a first resistance component 32, and a first floating diffusion region 37. A gate of the first P-channel MOS transistor 31 is connected to the first monitoring sensor 5-1 and receives a first sensor output supplied from the first monitoring sensor 5-1. In addition, the second division region charge detecting section 14 includes a source follower including a second P-channel MOS transistor 33 and a second resistance component 34, and a second floating diffusion region 38. A gate of the second P-channel MOS transistor 33 is connected to the second monitoring sensor 5-2 and receives a second sensor output supplied from the second monitoring sensor 5-2. Similarly, the third division region charge detecting section 15 includes a source follower including a third P-channel MOS transistor 35 and a third resistance component 36, and a third floating diffusion region 39. A gate of the third P-channel MOS transistor 35 is connected to the third monitoring sensor 5-3 and receives a third sensor output supplied from the third monitoring sensor 5-3. As shown in FIG. 3, the source followers of the charge detecting circuit 11 in the present embodiment are configured by P-channel MOS transistors, and output terminals of the source followers are short-circuited.

FIG. 4A shows a temporal change of a charge detection signal outputted from the charge detecting circuit 11, and FIG. 4B shows an output of the comparator 21. FIG. 4C shows an output of the accumulation control signal generator 23, and FIG. 4D shows a temporal change of an operation of the light receiving section (pixel sequence) 2.

The charge accumulation starts at time t1. The charge is accumulated with the passage of time, and an output of a monitoring sensor goes to a lower level because of generated electrons. As described above, the output terminals of P-channel source followers of the first division region charge detecting section 13, the second division region charge detecting section 14, and the third division region charge detecting section 15 are short-circuited. Therefore, when the outputs of the three monitoring sensors have different levels, the charge detecting circuit 11 outputs a signal following a signal with a minimum of the three outputs, as shown in FIG. 4A. As shown in FIG. 4B, this signal is supplied to the comparator 21, and an output of the comparator 21 changes at time t2 when the minimum monitoring sensor output among the outputs from the three monitoring sensors becomes lower than a reference voltage.

As shown in FIG. 4C, the accumulation control-signal generator 23 generates the accumulation control signal in response to the output of the comparator 21 at time t2 to output to the accumulation control electrode 3. The accumulation control electrode 3 operates in response to the accumulation control signal and outputs a pixel signal.

By including a plurality of P-channel source followers configured by the P-channel MOS transistors and short-circuiting their output terminals of the source followers, the output signal of the charge detecting circuit 11 follows the lowest one of outputs of these source followers. The charge detecting circuit 11 detects a minimum level signal in an analog fashion by using the characteristics of the P-channel source follower. Accordingly, the solid-state imaging device 1 of the present invention can generate the accumulation control signal on the basis of outputs of the plurality of monitoring sensors without increasing the number of the comparators.

As mentioned above, according to the present invention, an accumulation time is controlled by using a minimum of the monitoring sensor outputs in order to avoid partial saturation of the pixel signal. In case that data in a dark scene is required, the accumulation may be controlled by using a maximum of the monitoring sensor outputs. In this case, the charge detecting circuit 11 is configured by the source followers of N-channel MOS transistors and their output terminals the source followers are short-circuited. An output of the charge detecting circuit 11 is supplied to the comparator. In this manner, the charge accumulation can be controlled by using the maximum of the monitoring sensor outputs.

Since the monitoring sensor output follows the maximum value, the output of the comparator 21 changes from, a High level to a Low level at time t3 in FIG. 4A.

For example, in case of using the minimum level of the monitoring sensor outputs, a same effect can be obtained by arranging the N-channel source followers at a latter part in which the output is inverted by an E/D inverter, and by shorting its output. As described above, a similar function can be realized by switching a channel of the source follower between N and P even at a position where a signal is inverted.

Although the present invention has been described above in connection with several embodiments thereof, it would be apparent to those skilled in the art that those embodiments are provided solely for illustrating the present invention, and should not be relied upon to construe the appended claims in a limiting sense.

What is claimed is:

1. A solid-state imaging device comprising:
   a light receiving section comprising a plurality of pixels, wherein said light receiving section is divided into a plurality of division regions;
   a charge transferring section configured to transfer charges accumulated in said light receiving section;
   an accumulation control electrode provided between said light receiving section and said charge transferring section and configured to transfer the charge accumulated in said light receiving section to said charge transferring section in response to an accumulation control signal;
   a monitoring sensor group comprising a plurality of monitoring sensors respectively provided for said plurality of division regions, and configured to output sensor outputs of said plurality of monitoring sensors corresponding to amounts of the charges of said plurality of division regions;
   a charge detecting circuit configured to output a charge detection signal indicating that a predetermined amount of charge is accumulated in at least one of said plurality of division, regions, based on the sensor outputs from said monitoring sensor group; and
   a signal control circuit configured to output the accumulation control signal in response to the charge detection signal,
   wherein said charge detecting circuit, comprises a plurality of division region charge detecting sections which are respectively provided for said plurality of monitoring sensors and whose outputs are short-circuited.

2. The solid-state imaging device according to claim 1, wherein said charge detecting circuit outputs as the charge detection signal, one of the sensor outputs which corresponds to a minimum change amount or a maximum change amount according to time passage, based on the outputs of said plurality of division region charge detecting sections.

3. The solid-state imaging device according to claim 2, wherein each of the sensor outputs indicates the charge amount accumulated in a corresponding one of said plurality of division regions,
   each of said plurality of division region charge detecting sections receives a corresponding one of the sensor out puts and outputs a voltage detection signal based on the received sensor output, and
   said charge detecting circuit outputs as the charge detection signal, one, corresponding to a minimum voltage or a maximum voltage, of the voltage detection signals from said plurality of the division region charge detecting sections.

4. The solid-state imaging device according to claim 3, wherein each of said plurality of division region charge detecting sections comprises a source follower, which comprises a MOS transistor having a gate which receives the sensor output from the corresponding monitoring sensor, a drain connected with the ground, and a source connected to an output terminal.

5. The solid-state imaging device according to claim 4, wherein said signal control circuit comprises a single comparator configured to output the accumulation control signal when the charge detection signal crosses a threshold value.

6. A method of controlling charge transfer in a solid-state imaging device, comprising:
   accumulating charges in a light receiving section comprising a plurality of division regions;
   generating sensor outputs corresponding to amounts of the charges accumulated in said plurality of division regions by a plurality of monitoring sensors respectively provided for said plurality of division regions;
   generating a charge detection signal indicating that a predetermined amount of charge is accumulated in at least one of said plurality of division regions, based on wired-OR of detection signals corresponding to the sensor outputs;
   generating an accumulation control signal in response to the charge detection signal; and
   transferring the accumulated charges from said light receiving section to a charge transferring section by an accumulation control electrode in response to an accumulation control signal.

7. The method according to claim 6, wherein said generating a charge detection signal comprises:
   generating as the charge detection signal, one of the sensor outputs which corresponds to a minimum change amount or a maximum change amount according to time passage, based on the outputs of a plurality of division region charge detecting sections provided for said plurality of monitoring sensors.

8. The method according to claim 7, wherein each of the sensor outputs indicates the charge amount accumulated in a corresponding one of said plurality of division regions,
   said generating the charge detection signal comprises:
   generating voltage detection signals based on the sensor outputs from said plurality of division region charge detecting sections; and
   generating as the charge detection signal, one of the voltage detection signals which corresponds to a minimum voltage or a maximum voltage, from said, plurality of the division region charge detecting sections.

9. The method according to claim 8, wherein said generating an accumulation control signal comprises:
   generating the accumulation control signal when the charge detection signal crosses a threshold value.

* * * * *